US010439427B2

(12) United States Patent
Salter et al.

(10) Patent No.: US 10,439,427 B2
(45) Date of Patent: Oct. 8, 2019

(54) DETERMINING A FUEL QUANTITY TO CHARGE A VEHICLE BATTERY

(71) Applicant: Ford Global Technologies, LLC, Dearborn, MI (US)

(72) Inventors: Stuart C. Salter, White Lake, MI (US); Annette Lynn Huebner, White Lake, MI (US); Pietro Buttolo, Dearborn Heights, MI (US); Brent Young, Bloomfield, MI (US); Matthew Dionise, Wyandotte, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 15/667,976

(22) Filed: Aug. 3, 2017

(65) Prior Publication Data

US 2019/0039475 A1    Feb. 7, 2019

(51) Int. Cl.
| | | |
|---|---|---|
| *B60L 11/18* | (2006.01) | |
| *H02J 7/04* | (2006.01) | |
| *B60L 3/00* | (2019.01) | |
| *H02J 7/02* | (2016.01) | |

(52) U.S. Cl.
CPC ........... *H02J 7/047* (2013.01); *B60L 3/0046* (2013.01); *B60L 11/1838* (2013.01); *B60L 11/1861* (2013.01); *H02J 7/025* (2013.01); *B60W 2510/244* (2013.01); *H01M 2220/20* (2013.01)

(58) Field of Classification Search
CPC ... B60L 11/1861; B60L 11/1838; H02J 7/025; H02J 7/047

USPC ......................................................... 320/109
See application file for complete search history.

(56) References Cited

U.S. PATENT DOCUMENTS

| | | | | |
|---|---|---|---|---|
| 4,199,037 A * | 4/1980 | White | ...................... | B60K 3/04 180/65.245 |
| 5,789,882 A * | 8/1998 | Ibaraki | ..................... | B60K 6/48 318/148 |
| 5,841,201 A * | 11/1998 | Tabata | ................... | B60K 6/365 290/40 C |
| 5,895,333 A * | 4/1999 | Morisawa | ................ | B60K 6/24 475/5 |
| 6,466,024 B1 * | 10/2002 | Rogers | ................ | B60L 11/1861 324/427 |

(Continued)

FOREIGN PATENT DOCUMENTS

| | | | |
|---|---|---|---|
| JP | 2009262613 A | * 11/2009 | |
| JP | 2012030667 A | * 2/2012 | .............. B60L 11/12 |

(Continued)

*Primary Examiner* — Robert Grant
*Assistant Examiner* — John T Trischler
(74) *Attorney, Agent, or Firm* — Frank MacKenzie; Bejin Bieneman PLC

(57) ABSTRACT

A computer is programmed to upon determining that a battery charge level of a battery of a vehicle is below a first threshold, determine a first fuel quantity for an engine to charge the battery to a second threshold; and actuate a vehicle component according to the first fuel quantity. The computer may transmit a message specifying a second fuel quantity that is a sum of a preset fuel quantity and the first fuel quantity. The computer may, upon determining that an ambient temperature is below a temperature threshold, provide an instruction to the engine to charge the battery to the second threshold.

16 Claims, 2 Drawing Sheets

(56) References Cited

U.S. PATENT DOCUMENTS

| | | | | |
|---|---|---|---|---|
| 6,480,767 B2* | 11/2002 | Yamaguchi | B60K 6/46 | 701/22 |
| 6,518,727 B2* | 2/2003 | Oomura | B60H 1/004 | 320/132 |
| 6,522,959 B1* | 2/2003 | Sawamura | B60K 6/485 | 701/22 |
| 6,583,599 B1* | 6/2003 | Phillips | B60K 6/485 | 320/104 |
| 6,801,839 B2* | 10/2004 | Kaji | G05D 1/0206 | 701/21 |
| 6,987,376 B2* | 1/2006 | Kanno | H02J 7/1461 | 123/339.15 |
| 7,064,525 B2 | 6/2006 | Pachciarz et al. | | |
| RE40,820 E* | 7/2009 | Rogers | B60L 11/1861 | 320/104 |
| 7,627,416 B2* | 12/2009 | Batenburg | F02D 19/027 | 123/525 |
| 7,639,019 B2 | 12/2009 | Bosse et al. | | |
| 7,689,330 B2* | 3/2010 | Moran | B60K 6/12 | 180/65.245 |
| 7,775,310 B2* | 8/2010 | Andri | B60K 6/48 | 180/65.28 |
| 7,800,247 B2* | 9/2010 | Chang | H02J 3/32 | 307/44 |
| 7,839,116 B2* | 11/2010 | Esaka | B60K 6/28 | 123/179.3 |
| 7,980,342 B2* | 7/2011 | Andri | B60L 50/16 | 180/65.28 |
| 8,080,970 B2* | 12/2011 | Seever | H02P 6/14 | 180/53.5 |
| 8,090,520 B2* | 1/2012 | Tate, Jr. | B60K 6/48 | 701/104 |
| 8,198,836 B2* | 6/2012 | Kachi | B60W 30/192 | 318/139 |
| 8,215,424 B2* | 7/2012 | Kaita | B60K 6/445 | 180/65.265 |
| 8,248,023 B2* | 8/2012 | Schwenke | B60K 6/28 | 320/104 |
| 8,330,415 B2* | 12/2012 | Sato | B60L 3/12 | 320/109 |
| 8,461,846 B2 | 6/2013 | Makarewicz | | |
| 8,473,114 B2* | 6/2013 | Bauerle | H01M 10/42 | 320/132 |
| 8,564,299 B2 | 10/2013 | Sauerwine et al. | | |
| 8,612,081 B2 | 12/2013 | Konishi | | |
| 8,994,336 B2* | 3/2015 | Brotto | H02J 7/0065 | 320/136 |
| 9,015,093 B1* | 4/2015 | Commons | G01C 21/3602 | 706/26 |
| 9,073,497 B2* | 7/2015 | Ogawa | B60R 16/033 | |
| 9,073,541 B2* | 7/2015 | Sugiyama | B60W 20/00 | |
| 9,145,130 B2* | 9/2015 | Maruyama | B60W 50/16 | |
| 9,211,890 B2* | 12/2015 | Miyashita | B60L 7/10 | |
| 9,322,348 B2* | 4/2016 | Yang | B60W 20/16 | |
| 9,344,008 B2* | 5/2016 | Brotto | H02J 7/0065 | |
| 9,415,762 B2* | 8/2016 | Treharne | F02N 11/0829 | |
| 9,421,846 B2* | 8/2016 | Ono | B60H 1/004 | |
| 9,482,167 B2* | 11/2016 | Zhang | F02D 41/0027 | |
| 9,539,997 B2* | 1/2017 | Sun | B60W 20/10 | |
| 9,605,606 B2* | 3/2017 | Dufford | F02D 29/02 | |
| 9,695,760 B2* | 7/2017 | Dufford | F02D 29/02 | |
| 9,855,854 B2* | 1/2018 | Nomoto | B60L 1/003 | |
| 9,875,440 B1* | 1/2018 | Commons | G01C 21/3602 | |
| 9,991,706 B2* | 6/2018 | Brotto | H02J 7/0065 | |
| 10,000,129 B2* | 6/2018 | Dunlap | B60L 11/1816 | |
| 10,005,475 B2* | 6/2018 | Mayer | B60W 50/14 | |
| 10,030,617 B2* | 7/2018 | Akinyemi | F02M 26/43 | |
| 10,042,359 B1* | 8/2018 | Konrardy | G05D 1/0088 | |
| 10,047,705 B2* | 8/2018 | Dudar | F02M 25/0836 | |
| 10,060,379 B2* | 8/2018 | Dudar | F02D 41/3082 | |
| 10,065,517 B1* | 9/2018 | Konrardy | G05D 1/0088 | |
| 10,086,782 B1* | 10/2018 | Konrardy | G05D 1/0088 | |
| 10,087,865 B2* | 10/2018 | Dudar | F02D 37/02 | |
| 2002/0062183 A1* | 5/2002 | Yamaguchi | B60K 6/46 | 701/22 |
| 2002/0113576 A1* | 8/2002 | Oomura | B60H 1/004 | 320/134 |
| 2003/0076071 A1* | 4/2003 | Kanno | H02J 7/1461 | 320/132 |
| 2003/0220724 A1* | 11/2003 | Kaji | G05D 1/0206 | 701/21 |
| 2005/0189928 A1* | 9/2005 | Pachciarz | H02J 7/1438 | 322/28 |
| 2007/0181354 A1* | 8/2007 | Andri | B60K 6/48 | 180/65.29 |
| 2007/0204594 A1* | 9/2007 | Ishii | B60K 6/48 | 60/274 |
| 2008/0093851 A1* | 4/2008 | Maeda | H01M 10/48 | 290/40 A |
| 2008/0110684 A1* | 5/2008 | Kaita | B60K 6/445 | 180/65.265 |
| 2008/0167788 A1* | 7/2008 | Tate | B60K 6/48 | 701/104 |
| 2008/0246488 A1* | 10/2008 | Bosse | G01R 19/16542 | 324/426 |
| 2009/0015193 A1* | 1/2009 | Esaka | B60K 6/28 | 320/103 |
| 2009/0115358 A1* | 5/2009 | Kachi | B60W 30/192 | 318/139 |
| 2009/0157289 A1* | 6/2009 | Graessley | B60L 3/12 | 701/123 |
| 2009/0242288 A1* | 10/2009 | Oyobe | B60L 11/123 | 180/65.265 |
| 2010/0076825 A1* | 3/2010 | Sato | B60L 3/12 | 705/14.1 |
| 2010/0198438 A1* | 8/2010 | Iraha | B60W 10/08 | 701/22 |
| 2011/0031915 A1* | 2/2011 | Seever | H02P 6/14 | 318/400.26 |
| 2011/0090726 A1* | 4/2011 | Brotto | H02J 7/0065 | 363/131 |
| 2011/0178654 A1* | 7/2011 | Bauerle | H01M 10/42 | 701/2 |
| 2012/0105067 A1* | 5/2012 | Makarewicz | G01R 31/3627 | 324/427 |
| 2012/0119747 A1* | 5/2012 | Sauerwine | G01R 31/362 | 324/432 |
| 2012/0253572 A1* | 10/2012 | Ogawa | B60R 16/033 | 701/22 |
| 2013/0041540 A1* | 2/2013 | Niimi | B60K 6/445 | 701/22 |
| 2013/0173106 A1* | 7/2013 | Konishi | B60K 6/46 | 701/22 |
| 2013/0211641 A1* | 8/2013 | Fujii | B60W 10/06 | 701/22 |
| 2013/0268182 A1* | 10/2013 | Treharne | F02N 11/0829 | 701/113 |
| 2013/0314052 A1* | 11/2013 | Nomoto | H02J 7/1446 | 320/155 |
| 2014/0012447 A1 | 1/2014 | Gao et al. | | |
| 2014/0176085 A1* | 6/2014 | Maruno | G01R 31/3679 | 320/162 |
| 2014/0214251 A1* | 7/2014 | Sugiyama | B60W 20/00 | 701/22 |
| 2014/0229048 A1* | 8/2014 | Kawata | B60K 6/48 | 701/22 |
| 2014/0323265 A1* | 10/2014 | Maruyama | B60W 50/16 | 477/3 |
| 2014/0330473 A1* | 11/2014 | Miyashita | B60L 7/10 | 701/22 |
| 2015/0120110 A1* | 4/2015 | Yang | B60K 6/20 | 701/22 |
| 2015/0183425 A1* | 7/2015 | Choi | B60W 10/02 | 701/22 |
| 2015/0207431 A1* | 7/2015 | Brotto | H02J 7/0065 | 363/131 |
| 2015/0226140 A1* | 8/2015 | Zhang | F02D 41/0027 | 123/497 |

(56) References Cited

U.S. PATENT DOCUMENTS

| | | | |
|---|---|---|---|
| 2015/0246591 A1* | 9/2015 | Ono | B60H 1/004 701/22 |
| 2015/0275787 A1* | 10/2015 | Dufford | F02D 29/02 701/102 |
| 2015/0275788 A1* | 10/2015 | Dufford | F02D 29/02 701/102 |
| 2016/0031428 A1* | 2/2016 | Sun | B60W 20/10 701/22 |
| 2016/0090001 A1* | 3/2016 | Nomoto | B60L 1/003 320/109 |
| 2016/0214490 A1* | 7/2016 | Soo | B60L 11/1861 |
| 2016/0230712 A1* | 8/2016 | Akinyemi | F02M 26/43 |
| 2016/0261114 A1* | 9/2016 | Brotto | H02J 7/0065 |
| 2017/0015208 A1* | 1/2017 | Dunlap | B60L 11/1816 |
| 2017/0066322 A1* | 3/2017 | Dudar | F02D 41/3082 |
| 2017/0193424 A1* | 7/2017 | Botea | G06Q 10/063114 |
| 2017/0213137 A1* | 7/2017 | Geller | G06N 5/04 |
| 2017/0260914 A1* | 9/2017 | Dudar | F02M 25/0836 |
| 2017/0282740 A1* | 10/2017 | Ichikawa | B60L 11/02 |
| 2017/0287234 A1* | 10/2017 | Hashimoto | G07C 5/08 |
| 2017/0329346 A1* | 11/2017 | Latotzki | B62D 15/0285 |
| 2017/0341769 A1* | 11/2017 | Haberbusch | F17C 5/007 |
| 2018/0003070 A1* | 1/2018 | Mischler | F01D 15/10 |
| 2018/0023495 A1* | 1/2018 | Dudar | F02D 37/02 701/102 |
| 2018/0045522 A1* | 2/2018 | Aziz | G01C 21/3407 |
| 2018/0058348 A1* | 3/2018 | Berkemeier | F02D 19/0607 |
| 2018/0094935 A1* | 4/2018 | O'Brien | G06Q 10/08 |
| 2018/0096541 A1* | 4/2018 | O'Brien | G07C 5/008 |
| 2018/0098227 A1* | 4/2018 | Carnelli | H04W 64/003 |
| 2018/0106654 A1* | 4/2018 | Kim | G05D 1/0011 |
| 2018/0164121 A1* | 6/2018 | Ichikawa | G01C 21/3469 |
| 2018/0229715 A1* | 8/2018 | Kinoshita | B60W 20/15 |
| 2018/0281774 A1* | 10/2018 | Fukuda | B60W 20/13 |
| 2018/0313303 A1* | 11/2018 | Akinyemi | F02M 26/43 |
| 2018/0321050 A1* | 11/2018 | Chase | G05D 1/0088 |
| 2018/0321674 A1* | 11/2018 | Chase | G05D 1/0088 |
| 2018/0321688 A1* | 11/2018 | Chase | G05D 1/0088 |
| 2018/0322775 A1* | 11/2018 | Chase | G05D 1/0088 |
| 2018/0361844 A1* | 12/2018 | Kinzuka | B60K 6/485 |

FOREIGN PATENT DOCUMENTS

| | | | |
|---|---|---|---|
| JP | 5077045 B2 | * 11/2012 | |
| JP | 2018131040 A | * 8/2018 | B60W 20/15 |
| KR | 20040009369 A | * 1/2004 | |

* cited by examiner

DETERMINING A FUEL QUANTITY TO CHARGE A VEHICLE BATTERY

BACKGROUND

After vehicles are manufactured at a vehicle-manufacturing plant, the vehicles are shipped to their final destinations, which may be dealerships, purchasers, etc. The vehicles may be shipped by semi-truck, rail, etc. While the vehicle is being shipped, an engine of the vehicle is not being run and thus a battery of the vehicle is not being charged. If the battery has too low a charge level before being shipped, then the battery may die while the vehicle is in transit.

DETAILED DESCRIPTION

Figure 1:
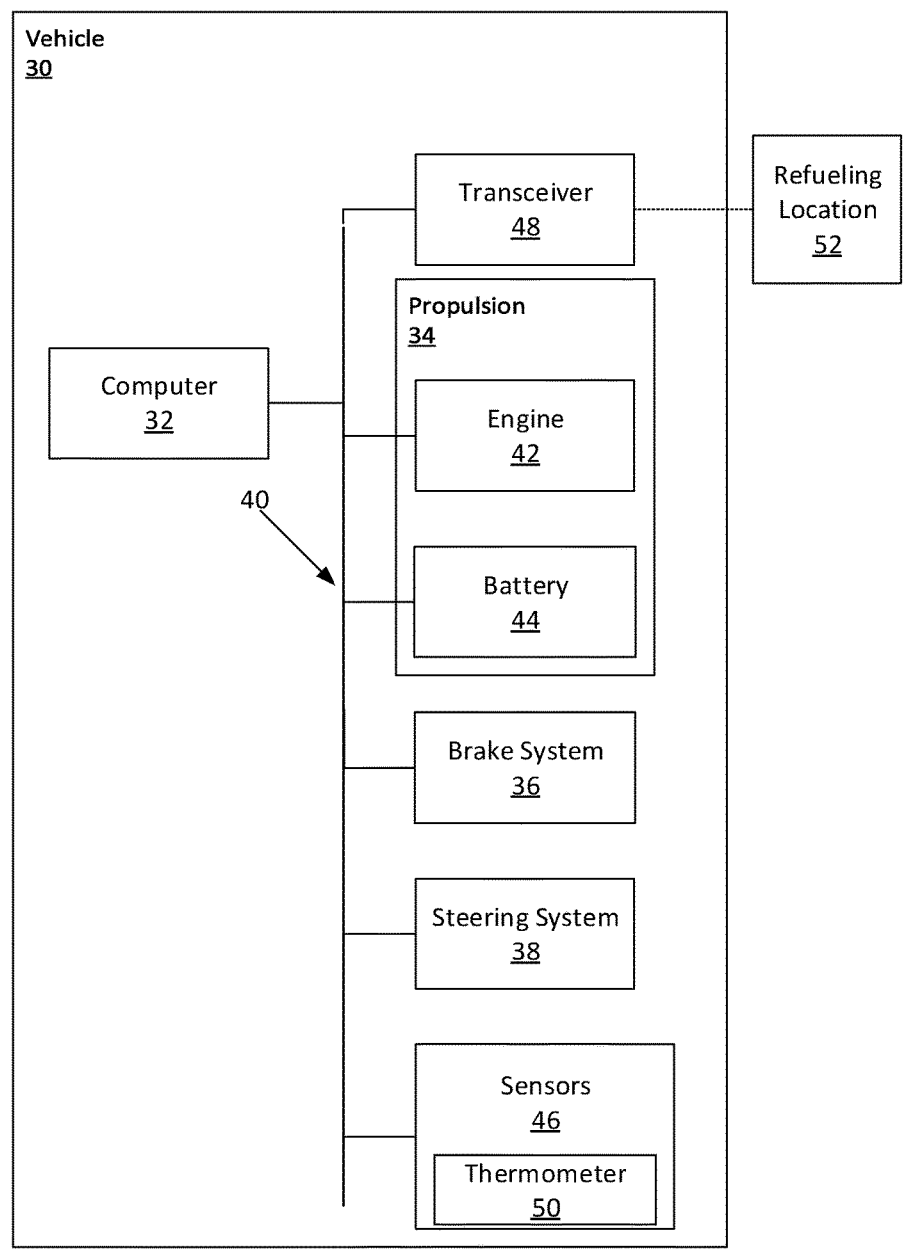
FIG. 1 is a block diagram of an example vehicle.

A vehicle as described below has the advantage of being able to ensure a sufficient charge of a battery in the vehicle before the vehicle is shipped. Furthermore, the vehicle is not filled with more fuel than is allowed for shipping the vehicle. The vehicle includes a computer that interacts with refueling apparatus at a vehicle-manufacturing plant and controls the charging of the battery by an engine of the vehicle. The vehicle controls the refueling and charging in a way that may lengthen a life of the battery.

A computer is programmed to, upon determining that a battery charge level of a battery of a vehicle is below a first threshold, determine a first fuel quantity for an engine to charge the battery to a second threshold, and actuate a vehicle component according to the first fuel quantity.

The second threshold may be greater than the first threshold.

Actuation of the vehicle component may include transmitting a message specifying a second fuel quantity that is a sum of a preset fuel quantity and the first fuel quantity. The computer may be programmed to, upon determining that the battery charge level is below the first threshold and that an ambient temperature is below a temperature threshold, provide an instruction to the engine to charge the battery to the second threshold.

The computer may be further programmed to identify a refueling location at which to obtain fuel according to the first fuel quantity. The vehicle component may include propulsion, steering, and braking, and the computer may be further programmed to navigate the vehicle to the identified refueling location.

The vehicle component may include the engine, and the computer may be programmed to, upon determining that the battery charge level is below the first threshold and that an ambient temperature is below a temperature threshold, provide an instruction to the engine to charge the battery to the second threshold. The instruction for the engine to charge the battery to the second threshold may include a specified time to begin charging. The specified time may be at night. The specified time may be a duration after sunset.

A method includes, upon determining that a battery charge level of a battery of a vehicle is below a first threshold, determining a first fuel quantity for an engine to charge the battery to a second threshold, and actuating a vehicle component according to the first fuel quantity.

The second threshold may be greater than the first threshold.

Actuating the vehicle component may include transmitting a message specifying a second fuel quantity that is a sum of a preset fuel quantity and the first fuel quantity. The method may include, upon determining that the battery charge level is below the first threshold and that an ambient temperature is below a temperature threshold, providing an instruction to the engine to charge the battery to the second threshold.

The method may include identifying a refueling location at which to obtain fuel according to the first fuel quantity. The vehicle component may include propulsion, steering, and braking, and the method may further include navigating the vehicle to the refueling location.

The vehicle component may include the engine, and the method may further include, upon determining that the battery charge level is below the first threshold and that an ambient temperature is below a temperature threshold, providing an instruction to the engine to charge the battery to the second threshold. The instruction for the engine to charge the battery to the second threshold may include a specified time to begin charging. The specified time may be at night. The specified time may be a duration after sunset.

A vehicle 30 may be an autonomous vehicle. A computer 32 can be configured to operate the vehicle 30 independently of the intervention of a human driver, completely or to a lesser degree. The computer 32 may be programmed to operate a propulsion 34, brake system 36, steering system 38, and/or other vehicle systems. For the purposes of this disclosure, autonomous operation means the computer 32 controls the propulsion 34, brake system 36, and steering system 38; semi-autonomous operation means the computer 32 controls one or two of the propulsion 34, brake system 36, and steering system 38 and a human driver controls the remainder; and nonautonomous operation means the human driver controls the propulsion 34, brake system 36, and steering system 38.

The computer 32 is a microprocessor-based computer. The computer 32 includes a processor, memory, etc. The memory of the computer 32 includes memory for storing instructions executable by the processor as well as for electronically storing data and/or databases.

The computer 32 may transmit signals through a communications network 40 such as a controller area network (CAN) bus, Ethernet, WiFi, Local Interconnect Network (LIN), onboard diagnostics connector (OBD-II), and/or by any other wired or wireless communications network. The computer 32 may be in communication with the propulsion 34, including an engine 42 and a battery 44; the steering system 38; the brake system 36; sensors 46; and a transceiver 48.

The propulsion 34 of the vehicle 30 generates energy and translates the energy into motion of the vehicle 30. The propulsion 34 may be a known vehicle propulsion subsystem, for example, a conventional powertrain including an internal-combustion engine 42 coupled to a transmission that transfers rotational motion to wheels; or a hybrid powertrain including elements of the conventional powertrain and of an electric powertrain, such as an electric motor. The propulsion 34 can include an electronic control unit (ECU) or the like that is in communication with and receives input from the controller and/or a human driver. The human driver may control the propulsion 34 via, e.g., an accelerator pedal and/or a gear-shift lever.

The engine 42 may be an internal-combustion engine or a hybrid-electric engine. In an internal-combustion or hybrid-electric engine, the engine 42 includes a plurality of cylinders (not shown). The cylinders operate as combustion chambers in which a chemical reaction of a fuel translates into kinetic energy of a piston (not shown) of the cylinder. The pistons of the cylinders are coupled to the transmission such that linear movement of the pistons drives rotational motion of the transmission. The pistons may be coupled directly or indirectly, e.g., via a torque converter. The cylinders of the engine 42 fire in a predefined sequence.

The battery 44 in a hybrid powertrain may provide power for driving the vehicle 30, or the battery 44 in an internal-combustion powertrain may provide power primarily when the engine 42 is not running, such as to start the vehicle 30. The battery 44 may be of any suitable type for vehicular electrification, for example, lithium-ion batteries, nickel-metal hydride batteries, lead-acid batteries, or ultracapacitors, as used in, for example, plug-in hybrid electric vehicles (PHEVs), hybrid electric vehicles (HEVs), battery electric vehicles (BEVs), or conventional internal-combustion vehicles.

The steering system 38 is typically a known vehicle steering subsystem and controls the turning of the wheels. The steering system 38 may be a rack-and-pinion system with electric power-assisted steering, a steer-by-wire system, as both are known, or any other suitable system. The steering system 38 can include an electronic control unit (ECU) or the like that is in communication with and receives input from the computer 32 and/or a human driver. The human driver may control the steering system 38 via, e.g., a steering wheel.

The brake system 36 is typically a known vehicle braking subsystem and resists the motion of the vehicle 30 to thereby slow and/or stop the vehicle 30. The brake system 36 may include friction brakes such as disc brakes, drum brakes, band brakes, etc.; regenerative brakes; any other suitable type of brakes; or a combination. The brake system 36 can include an electronic control unit (ECU) or the like that is in communication with and receives input from the computer 32 and/or a human driver. The human driver may control the brake system 36 via, e.g., a brake pedal.

The sensors 46 may provide data about operation of the vehicle 30, for example, wheel speed, wheel orientation, and engine and transmission data (e.g., temperature, fuel consumption, etc.). The sensors 46 may detect the location and/or orientation of the vehicle 30. For example, the sensors 46 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 46 may detect the external world. For example, the sensors 46 may include radar sensors, scanning laser range finders, light detection and ranging (LIDAR) devices, and image processing sensors such as cameras.

The sensors 46 may include a thermometer 50 to measure an ambient temperature, i.e., a temperature of surrounding air of the external environment. The thermometer 50 may be any suitable type, e.g., magnetic, bimetallic strip, etc. The thermometer 50 may be disposed at any location at which the thermometer 50 can achieve thermal equilibrium with the external environment.

The transceiver 48 may be adapted to transmit signals wirelessly through any suitable wireless communication protocol, such as Bluetooth®, Bluetooth Low Energy (BLE), WiFi, IEEE 802.11a/b/g, other RF (radio frequency) communications, etc. The transceiver 48 may be adapted to communicate with a remote server, that is, a server distinct and spaced from the vehicle 30. The remote server may be located outside the vehicle 30. For example, the remote server may be associated with other vehicles (e.g., V2V communications), infrastructure components (e.g., V2I communications), emergency responders, mobile devices associated with the owner of the vehicle 30, a refueling location 52, etc. The transceiver 48 may be one device or may include a separate transmitter and receiver.

The refueling location 52 is a location (e.g., according to geo-coordinates as are known) that includes a fuel source for the vehicle 30 and that includes a computing device that can communicate with the vehicle 30 via the transceiver 48. The refueling location 52 has a fixed location and can refuel the vehicle 30 when the vehicle 30 occupies a fixed position relative to the refueling location 52. The refueling location 52 may include a fuel reservoir, a pump positioned to pump fuel from the fuel reservoir, and a nozzle receiving fuel from the pump and shaped to deliver fuel to the vehicle 30. The refueling location 52 may be manually operated, completely automated, or partially manually operated and partially automated. The refueling location 52 computing device can communicate with the vehicle 30 via the transceiver 48; for example, the refueling location 52 can receive a message from the vehicle 30 specifying a quantity of fuel and then provide that quantity of fuel to the vehicle 30. The fuel may be any fuel on which the engine 42 can operate, e.g., gasoline, diesel, hydrogen fuel, etc. The refueling location 52 may be located in a vehicle-manufacturing plant and may fuel the vehicle 30 before the vehicle 30 is shipped to, e.g., a dealership or consumer.

Figure 2:
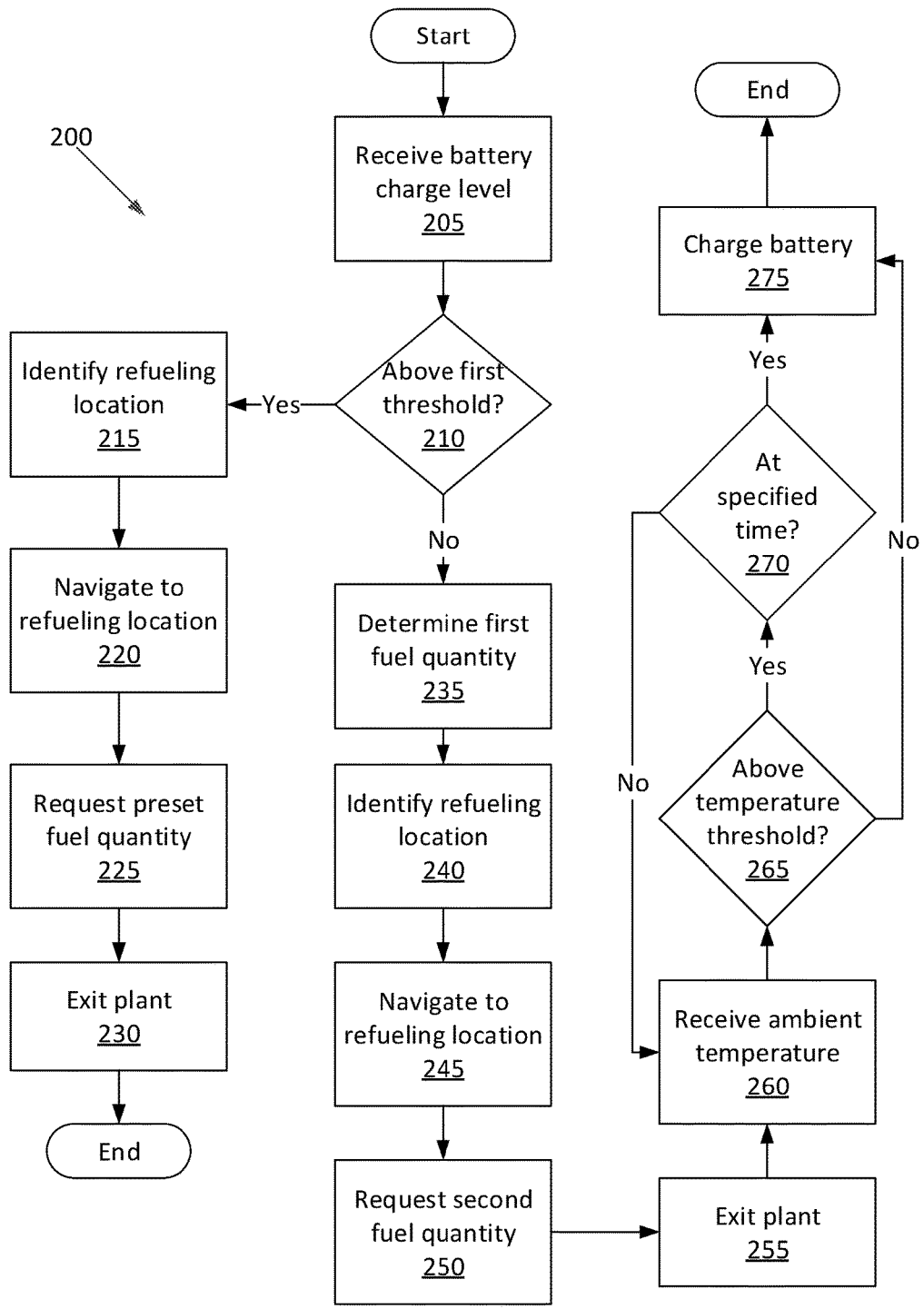
FIG. 2 is a process flow diagram of an example process for fueling a vehicle.

FIG. 2 is a process flow diagram illustrating an exemplary process 200 for fueling the vehicle 30. The memory of the computer 32 stores programming for performing the steps of the process 200. The process 200 may begin when the vehicle 30 is activated in a vehicle-manufacturing plant.

The process 200 begins in a block 205, in which the computer 32 receives a battery charge level of the battery 44. The battery 44 may report its charge level to the computer 32 via the communications network 40. The battery charge level is how much energy remains in the battery 44. The battery charge level may be expressed in units of energy, e.g., Joules, or as a proportion of the capacity of the battery 44.

Next, in a decision block 210, the computer 32 determines whether the battery charge level is above a first threshold. (The adjectives "first" and "second" are used throughout this document as identifiers and are not intended to signify importance or order.) The first threshold is a preset value stored in the memory of the computer 32 and is expressed in the same units as the battery charge level. The first threshold may be chosen based on ensuring that battery life of the battery 44 does not excessively degrade during shipment of the vehicle 30 while taking into account variability in charge levels. The first threshold may be, e.g., 90%. If the battery 44 charge level is below the threshold, the process 200 proceeds to a block 235.

If the battery charge level is above the threshold, next, in a block 215, the computer 32 identifies the refueling location 52. A location of the refueling location 52 may be stored in the memory of the computer 32, e.g., as geocoordinates, such as GPS coordinates or local coordinates relative to the vehicle-manufacturing plant. Alternatively, the computer 32 may receive a message including the location via the transceiver 48, e.g., from the refueling location 52. As another alternative, the computer 32 may receive images from the sensors 46 and perform a known object-recognition algorithm on the images to recognize guiding features of the vehicle-manufacturing plant leading to the refueling location 52. The guiding features may be pre-stored in the memory of the computer 32 as baseline images for the computer 32 to compare to the images received from the sensors 46. The guiding features may be, e.g., lines on a floor of the vehicle-manufacturing plant that form a path to the refueling location 52. The lines may have a color reflectivity, etc. contrasting with other features of the vehicle-manufacturing plant so as to be more easily recognized by the object-recognition algorithm of the computer 32. The operators of the vehicle-manufacturing plant may, when activating the vehicle 30, place the vehicle 30 at a location at which a beginning of the path of the guiding features is visible to the sensors 46 of the vehicle 30.

Next, in a block 220, the computer 32 navigates the vehicle 30 to the refueling location 52. The computer 32 instructs the propulsion 34, the steering system 38, and the brake system 36 according to autonomous-driving techniques to drive the vehicle 30 to a location relative to the refueling location 52 that gives the refueling location 52 access to refuel the vehicle 30. For example, the computer 32 may use the autonomous-driving techniques to follow the guiding features to the refueling location 52.

Next, in a block 225, the computer 32 requests a preset fuel quantity from the refueling location 52. The computer 32 may instruct the transceiver 48 to transmit a message requesting the preset fuel quantity to the refueling location 52. The preset fuel quantity may be stored in the memory of the computer 32, or the preset fuel quantity may be a default quantity of fuel stored in a memory of the refueling location 52. The preset fuel quantity may be chosen as a minimal quantity for the vehicle 30 to operate upon arrival after shipment, and/or may be chosen to be at or below legal or recommended regulations for vehicle shipping.

Next, in a block 230, the vehicle 30 exits a vehicle-manufacturing plant. The computer 32 instructs the propulsion 34, the steering system 38, and the brake system 36 according to autonomous-driving techniques to drive the vehicle 30 outside the plant to a designated location. The designated location may be stored in the memory of the computer 32 or transmitted to the computer 32 via the transceiver 48. After the block 230, the process 200 ends.

If the battery charge level is below the threshold, after the decision block 210, in the block 235, the computer 32 determines a first fuel quantity for the engine 42 to charge the battery 44 to a second threshold. The second threshold is expressed in the same units as the battery charge level and may be greater than the first threshold. The second threshold may be chosen based on ensuring that battery life of the battery 44 does not excessively degrade during shipment of the vehicle 30. The second threshold may be, e.g., 98%. The first fuel quantity is determined based on the battery charge level of the battery 44. Values of the first fuel quantity may be stored in a lookup table in the memory of the computer 32 with corresponding values of the battery charge level. The values of the first fuel quantity corresponding to the values of the battery charge level may be chosen by testing how much fuel the engine 42 needs to charge the battery 44 by a given charge level.

Next, in a block 240, the computer 32 identifies the refueling location 52, as described above with respect to the block 215.

Next, in a block 245, the computer 32 navigates the vehicle 30 to the refueling location 52, as described above with respect to the block 220.

Next, in a block 250, the computer 32 requests a second fuel quantity from the refueling location 52. The computer 32 may instruct the transceiver 48 to transmit a message requesting the second fuel quantity to the refueling location 52. The second fuel quantity may be a sum of the first fuel quantity and the preset fuel quantity. The message to the refueling location 52 may include the second fuel quantity, or the message may include the first fuel quantity, to which the refueling location 52 will add the preset fuel quantity stored as a default by the refueling location 52. In other words, the computer 32 actuates a vehicle component according to the first fuel quantity.

Next, in a block 255, the vehicle 30 exits the vehicle-manufacturing plant, as described above with respect to the block 230. The designated location may be different for vehicles 30 with battery charge levels above or below the first threshold.

Next, in a block 260, the computer 32 receives an ambient temperature. The thermometer 50 detects the ambient temperature and transmits a signal through the communications network 40 to the computer 32.

Next, in a decision block 265, the computer 32 determines whether the ambient temperature is above a temperature threshold. The temperature threshold may be stored in the memory of the computer 32. The temperature threshold may be chosen as a temperature that the external environment regularly reaches and at which charging the battery 44 does not excessively diminish the life of the battery 44, e.g., 50° F. If the ambient temperature is below the temperature threshold, the process 200 proceeds to a block 275.

If the ambient temperature is above the temperature threshold, next, in a decision block 270, the computer 32 determines whether a specified time has been reached. The specified time is a time of day. The specified time may be a preset time stored in the memory of the computer 32. The specified time may be chosen as a time of day likely to be cool, such as at night. The specified time may be a duration after sunset, e.g., six hours. The duration may be chosen to maximize the likelihood that the ambient temperature is cool. The computer 32 may determine when sunset occurs via a light sensor (not shown) or via calendar data received by the transceiver 48 or stored in memory. If the specified time has not yet been reached, the process 200 returns to the block 260 to retest whether the ambient temperature is cool enough.

If the ambient temperature is below the temperature threshold, after the decision block 265, or if the specified time has been reached, after the decision block 270, in the block 275, the computer 32 instructs the engine 42 to charge the battery 44 to the second threshold. The engine 42 will use approximately the first fuel quantity to do so, leaving approximately the preset fuel quantity. In other words, the computer 32 actuates a vehicle component according to the first fuel quantity. After the block 275, the process 200 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary. Use of "in response to" and "upon determining" indicates a causal relationship, not merely a temporal relationship.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A computer comprising a processor and a memory storing instructions executable by the processor to:
   upon determining that a battery charge level of a battery of a vehicle is below a first threshold, determine a first fuel quantity for an engine to charge the battery to a second threshold;
   identify a refueling location at which to obtain fuel according to the first fuel quantity;
   navigate the vehicle to the identified refueling location using propulsion, steering, and braking;
   request a preset fuel quantity from the refueling location in response to the battery charge level being above the first threshold; and request a second fuel quantity from the refueling location in response to the battery charge level being below the first threshold.

2. The computer of claim 1, wherein the second threshold is greater than the first threshold.

3. The computer of claim 1, wherein the instructions further include to transmit a message specifying the second fuel quantity, wherein the second fuel quantity is a sum of the preset fuel quantity and the first fuel quantity.

4. The computer of claim 3, wherein the instructions further include to, upon determining that the battery charge level is below the first threshold and that an ambient temperature is below a temperature threshold, provide an instruction to the engine to charge the battery to the second threshold.

5. The computer of claim 1, wherein the instructions further include to, upon determining that the battery charge level is below the first threshold and that an ambient temperature is below a temperature threshold, provide an instruction to the engine to charge the battery to the second threshold.

6. The computer of claim 5, wherein the instruction for the engine to charge the battery to the second threshold includes a specified time to begin charging.

7. The computer of claim 6, wherein the specified time is at night.

8. The computer of claim 7, wherein the specified time is a duration after sunset.

9. A method comprising:
upon determining that a battery charge level of a battery of a vehicle is below a first threshold, determining a first fuel quantity for an engine to charge the battery to a second threshold;
identifying a refueling location at which to obtain fuel according to the first fuel quantity;
navigating the vehicle to the identified refueling location using propulsion, steering, and braking;
requesting a preset fuel quantity from the refueling location in response to the battery charge level being above the first threshold; and
requesting a second fuel quantity from the refueling location in response to the battery charge level being below the first threshold.

10. The method of claim 9, wherein the second threshold is greater than the first threshold.

11. The method of claim 9, further comprising transmitting a message specifying the second fuel quantity, wherein the second fuel quantity is a sum of the preset fuel quantity and the first fuel quantity.

12. The method of claim 11, further comprising, upon determining that the battery charge level is below the first threshold and that an ambient temperature is below a temperature threshold, providing an instruction to the engine to charge the battery to the second threshold.

13. The method of claim 9, further comprising, upon determining that the battery charge level is below the first threshold and that an ambient temperature is below a temperature threshold, providing an instruction to the engine to charge the battery to the second threshold.

14. The method of claim 13, wherein the instruction for the engine to charge the battery to the second threshold includes a specified time to begin charging.

15. The method of claim 14, wherein the specified time is at night.

16. The method of claim 15, wherein the specified time is a duration after sunset.

* * * * *